United States Patent [19]

Arsenault et al.

[11] Patent Number: 5,748,092
[45] Date of Patent: May 5, 1998

[54] CEILING TILE MOISTURE DETECTION SYSTEM

[76] Inventors: Marc J. Arsenault, 98 Oxbow Rd., Charlton, Mass. 01507; Aaron C. DerMarderosian, Sr., 376 Lincoln St., Lexington, Mass. 02173

[21] Appl. No.: 637,309

[22] Filed: Apr. 24, 1996

[51] Int. Cl.⁶ ............................................. G08B 21/00
[52] U.S. Cl. .................... 340/604; 340/602; 340/605; 52/1; 52/506.07
[58] Field of Search ............................ 340/604, 605, 340/602, 539; 52/1 R, 506.07 R, 741.3; 427/79, 80, 100, 256; 29/874, 884, 885, 25.35, 25.41

[56] References Cited

U.S. PATENT DOCUMENTS

| | | | |
|---|---|---|---|
| 3,824,460 | 7/1974 | Gustafson | 324/664 |
| 3,882,496 | 5/1975 | Löfgren | 340/602 |
| 3,992,102 | 11/1976 | Kajii | 356/338 |
| 4,110,945 | 9/1978 | Sheahan | 340/602 |
| 4,502,044 | 2/1985 | Farris et al. | 340/604 |
| 4,695,787 | 9/1987 | Billet et al. | 340/605 |
| 4,947,470 | 8/1990 | Darilek | 340/605 |
| 4,950,105 | 8/1990 | Meess et al. | 405/128 |
| 4,955,983 | 9/1990 | Meess et al. | 405/128 |
| 5,008,652 | 4/1991 | Woloszyk | 340/604 |
| 5,081,422 | 1/1992 | Shih | 340/605 |
| 5,291,181 | 3/1994 | DePonte | 340/604 |

*Primary Examiner*—Jeffery Hofsass
*Assistant Examiner*—Daniel J. Wu
*Attorney, Agent, or Firm*—Donald F. Mofford; Glenn H. Lenzen, Jr.

[57] ABSTRACT

Ceiling tiles and a moisture detection system in which an array of electrodes placed preferably on the top unseen surface of the ceiling tiles typically used in commercial-type buildings. A detection or controller circuit then monitors the electrical characteristics of these electrodes for any changes that would be indicative of water formation on the ceiling tiles. Generally, current will flow between the electrodes only in the presence of water or some other conducting fluid. When this current is detected, an alarm, for example, can be generated to notify security monitoring personnel to investigate the possible existence of water intrusion. Alternatively, coded signals can be generated at the ceiling tiles individually in the presence of water.

12 Claims, 5 Drawing Sheets

CEILING TILE MOISTURE DETECTION SYSTEM

The government has rights in this invention pursuant to Contract No. N00030-93-C-0040 awarded by the Department of the Navy.

BACKGROUND OF THE INVENTION

As electronic and mechanical devices become more sophisticated, operating environment constraints become tighter and tighter. The current generation system may not tolerate the temperature or humidity levels in which systems of the previous generation worked. Yet, major sources of moisture such as water intrusion into the laboratories and offices remain. Delicate electrical or electrical mechanical parts can be shorted-out or otherwise damaged by the formation of water on their conducting surfaces.

SUMMARY OF THE INVENTION

We have found that the principle location of water intrusion is from the ceiling. The flat roofs of today's commercial buildings allow water to stand so that if a defect in the tar or membrane surface of the roof exists, the water will enter the building. Moreover, pipes, conduits, and ducts are typically located in the region between the inner ceiling, commonly constructed from ceiling tile, and the structural ceiling or roof, which separates floors or the building from the outside. In particular, dehumidifiers, defective pipe joints, air conditioning troughs, and cold water pipes represent the major water sources, and as explained earlier, even a few centiliters of unfortunately placed water can lead to substantial monetary damage to sensitive components.

The present invention is conceived as an early detection system for water intrusion from the ceiling. It works in cooperation with, or is integral with, the ceiling tiles that are ubiquitous in commercial-type buildings. An array of electrodes are placed typically on the top, unseen, surface of the ceiling tiles. A detection circuit then monitors the electrical characteristics of these electrodes for any changes that would be indicative of water formation on the ceiling tiles. When water is detected, an alarm, for example, can be generated so that security monitoring personnel can investigate the situation.

In specific embodiments, the electrodes are configured as a pair of interleaved electrodes held at different electrical potentials. A controller generates an alarm condition in response to sensing current flow between the pair of electrodes. Alternatively, a coded transmitter can be placed on or incorporated in each tile, which transmits a signal to a receiver in response to the occurrence of resistance across the electrodes. In either case, the electrodes are preferably applied to the tiles in the form of a conductive paint preferably applied by a silk screening or roller process.

In other embodiments, a continuity verification circuit is useful to ensure that the detection electrodes are properly connected to each other. Specifically, the circuit can detect if the electrodes themselves are broken or a jumper or inter-tile connector has become disattached by generating electrical current flow through the series connected electrodes.

According to another aspect, the invention can also be characterized as a method for detecting moisture intrusion in a building. This method features detecting electrical current flow between electrodes located on ceiling tiles. An alarm is then generated when the current flow is indicative of moisture on the ceiling tiles.

According to still another aspect, the invention concerns a ceiling tile or method of forming the same. The tile includes at least a pair of electrodes formed on a surface thereof. The electrodes can be formed from a conductive paint.

In specific embodiments, the electrodes are formed on a top surface and cover a substantial portion of the ceiling tile. The coverage is achieved by interleaving the electrodes with each other. Further, the tile may also incorporate a water activated battery material and a transmitter, which generates an alarm signal when battery material is exposed to moisture in sufficient amounts to cause current to flow through the electrodes.

The above and other features of the invention including various novel details of construction and combinations of parts, and other advantages, will now be more particularly described with reference to the accompanying drawings and pointed out in the claims. It will be understood that the particular method and device embodying the invention is shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
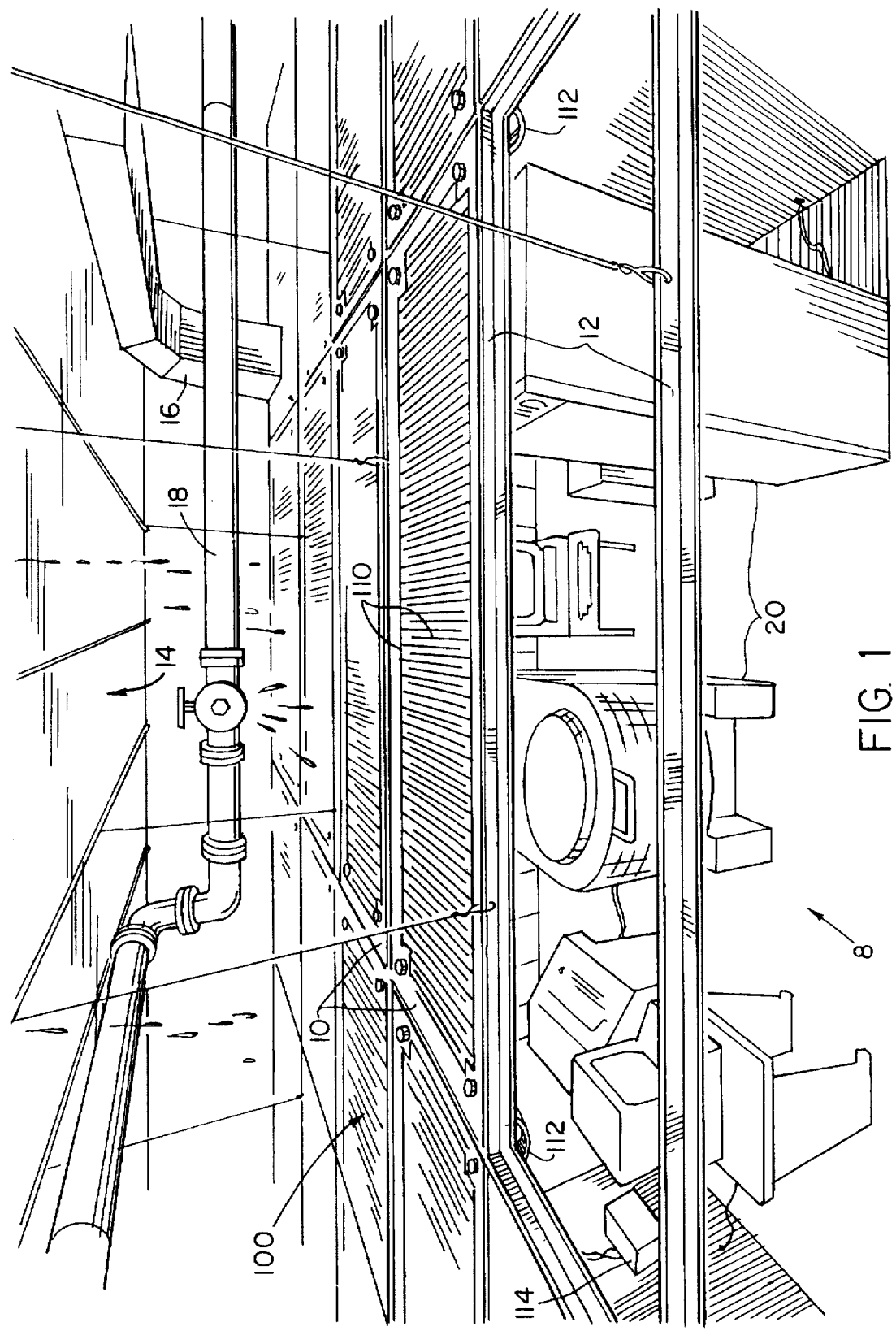
FIG. 1 is a perspective view of the moisture detection system of the present invention in its typical operating environment with common sources of water intrusion illustrated.

FIG. 1 is a schematic illustration showing a moisture detection system 100, which has been constructed according to the principles of the present invention, in its intended operating environment.

The system 100 comprises interleaved comb electrodes 110 that are located on the top surfaces of ceiling tiles 10. Jumpers 112 connect the comb electrodes 110 of adjacent tiles to form a continuous electrical circuit. A controller 114 is connected to the ceiling tile circuit to detect any short circuits between the interleaved comb electrodes 110 of any one of the tiles 10. Conduction paths between the electrodes are indicative of water or fluid formation on the tile's top surfaces.

The system 100 is typically located on the ceiling tiles of a hung ceiling. The tiles are supported by a metal or plastic frame 12. Any water intrusion through the structural roof 14 or from the ducts 16, pipes 18 or other sources will first fall onto the tiles 10, triggering the system 100. As a result, even small leaks that are not large enough to cause staining on the underside of the tiles 10 can be detected before damage occurs to the water sensitive systems 20 within the room 8.

Figure 2:
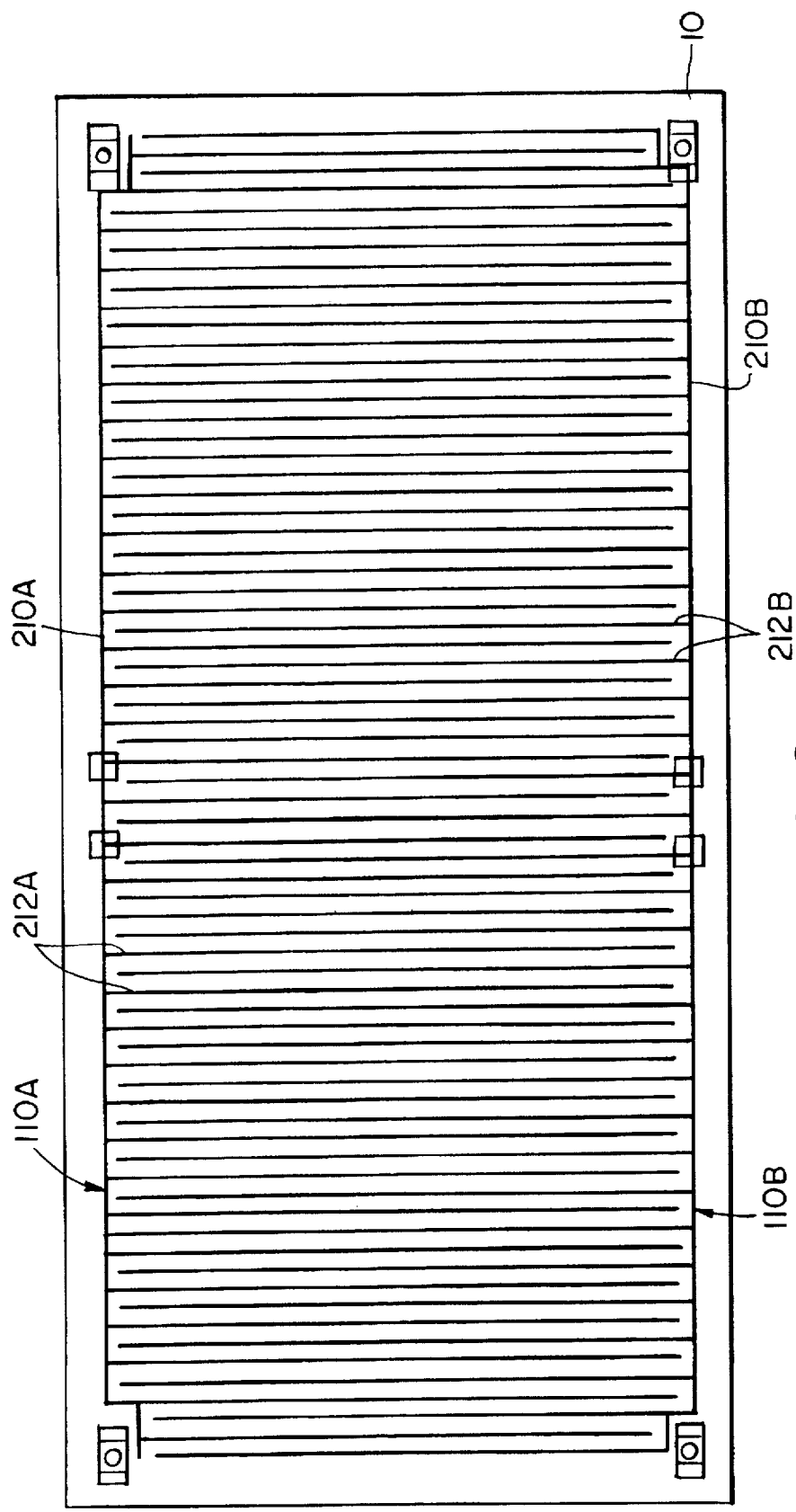
FIG. 2 shows the interleaved comb electrode pattern applied to the top surface of a ceiling tile according to the present invention.

FIG. 2 shows an exemplary electrode layout on the top side of a ceiling tile 10. The tile preferably has first and second electrodes 110A, 110B that are held at different electrical potentials. The first electrode 110A comprises a backbone conducting strip 210A that extends longitudinally along a lateral side of the ceiling tile 10. A plurality of conducting tines 212A extend from this backbone 210A perpendicularly across the ceiling tile 10. The second electrode 110B is similarly configured, comprising a backbone conducting strip 210B extending longitudinally down the other side of the ceiling tile 10. The second electrode 110B also has tine conducting strips 212B extending longitudinally across the tile 10. The tine conducting strips 212A, 212B from each of the first and second electrodes 110A, 110B are interleaved with each other with a separation of less than one inch so that small amounts of water will act as a short circuit between the first and second electrodes 110A,110B to thereby initiate electrical current flow that is detected by the controller 114.

The electrodes 110A,110B can be manufactured in a number of different ways. Experiments have been performed in which the electrodes were constructed from copper tape or with printed circuit technology. These products, however, are expensive, and the application process is time consuming.

The electrodes can also be made with a conductive paint and be applied with a silk screening process. A primer sealer is first applied to the top surface of the tile 10. The sealing process is necessary to provide a functional surface for the subsequent conductive coating. Military Part No. TT-P-645 was found to be acceptable. Other single component acrylic or alkaloid based primer/sealers, however, are available that are less expensive. Preferably, an approximately 1.5–2.0 mil dry film is applied to the tile. The primer is air dried for 18–24 hours before top coating. This can be accelerated with curing of 45 to 90 minutes at 175° F. to 200° F.

An acrylic-based treated-copper top coat is then selectively applied to the top surface of the ceiling tiles in the electrode pattern. SPRAYLAT's 599-Y2000 was found to be a reliable conductive coating system. This product is a copper-filled single-component air drying acrylic coating. The copper is treated to drastically retard filler oxidation. The resistivity ranges from 0.02–0.05 ohms per cm² depending upon thickness. It is important to note that whatever type of conductive paint is used that the conductive components should protrude through its surface so that the water will form a conductive circuit with the paint. It is anticipated that in production situations, the first and second electrodes will be applied by a roller process.

Figure 3:
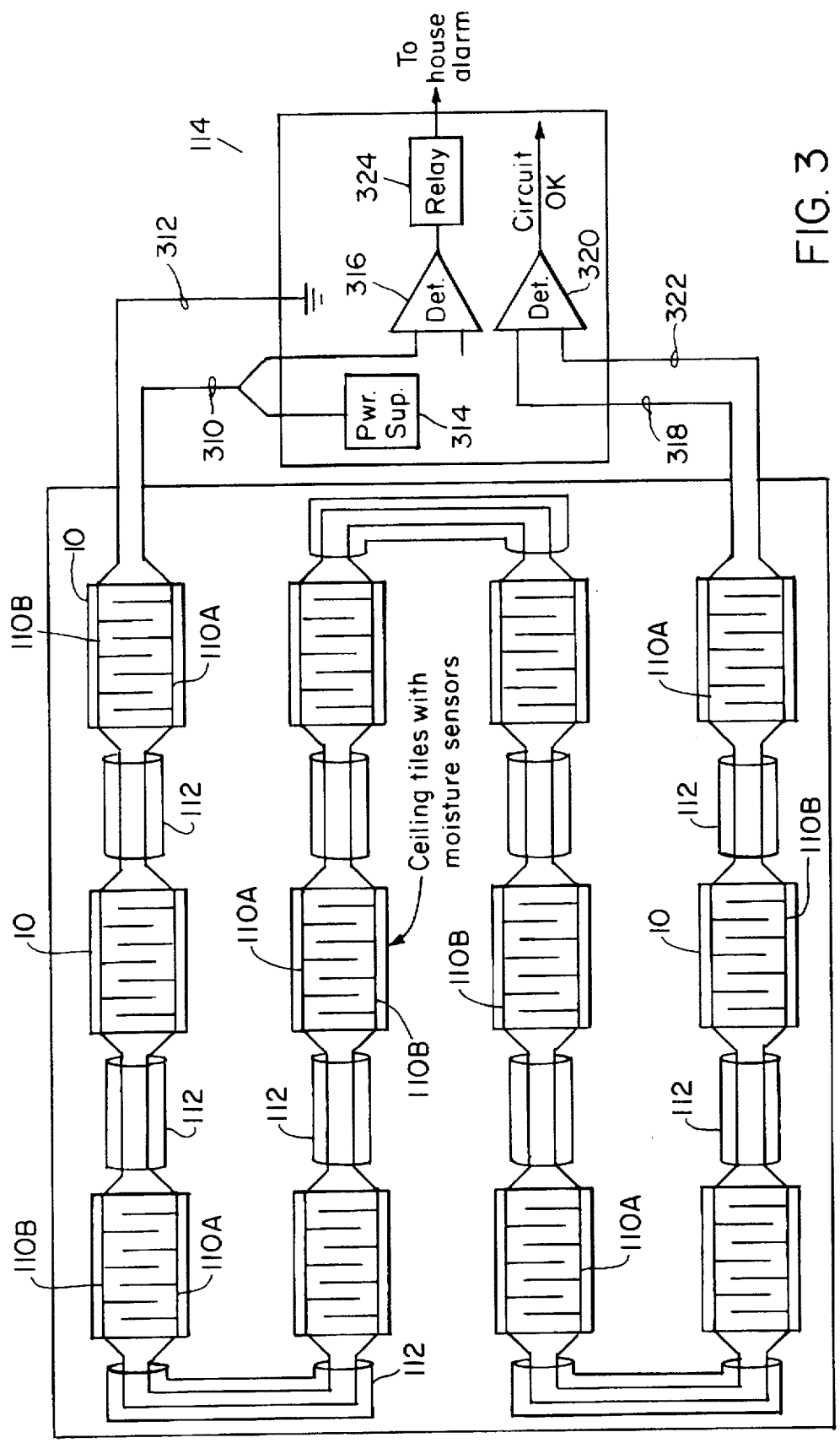
FIG. 3 is a schematic circuit diagram showing the interconnection of a 4×3 array of ceiling tiles according to the present invention.

FIG. 3 is a circuit diagram illustrating the strategy for interconnecting the tiles 10 to each other and the controller 114. All of the first electrodes 110A of the ceiling tiles 10 are connected in series. A first end terminal 310 of the series is connected to a power supply 314 and a moisture detection circuit 316. The second end terminal 318 of the first electrodes 110A is connected to a continuity verification circuit 320. Jumper cables 112 interconnect the electrodes of adjacent tiles 10.

Each of the second electrodes 110B is connected in series to each other. The first end terminal 312 of the series second electrodes is connected to a ground or reference potential and the second end terminal 322 is received at the continuity verification circuit 320.

The moisture detection circuit detects current flow between the first electrodes 110A and the second electrodes 110B. When a threshold current flow is exceeded, a relay 324 is triggered which generates a signal to an alarm.

The continuity verification circuit 320 operates independently of the moisture detection circuit 316 to ensure that a break does not exist in either the series connected first electrodes or the second electrodes. Otherwise, a lack of current flow between the electrodes could merely be indicative of a break in an electrode or a defective or miswired jumper cable.

Figure 4:
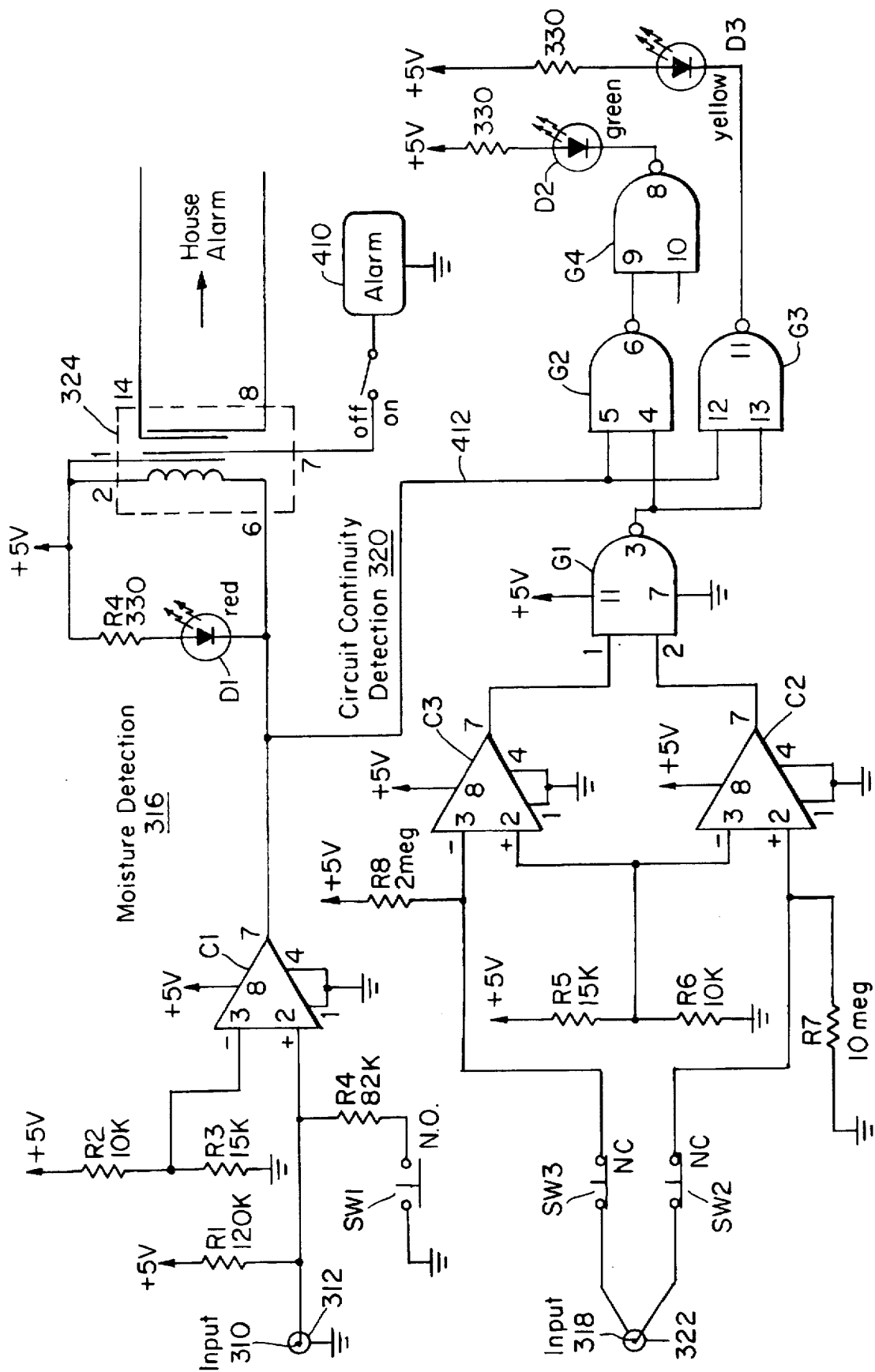
FIG. 4 is a circuit diagram showing the moisture detection and continuity verification circuits of the present invention.

FIG. 4 is a circuit diagram of the controller's moisture detection and continuity verification circuits 316,320. The first terminal 310 of the first electrodes 110A is connected to a 5 Volt power supply through a 120kΩ resistor R1. The terminal 310 is also connected to a non-inverting input terminal of comparitor C1. The comparitor C1 receives an approximately 3 Volt reference voltage at an inverting input terminal from the junction between a 10kΩ resistor R2 and a 15kΩ resistor R3 functioning as a voltage divider.

If moisture forms on the ceiling tiles 10, the first and second electrodes 110A,110B will be short-circuited with an estimated resistance of less than 250kΩ by the water or other fluid. The current will flow through resistor R1 lowering the voltage at the non-inverting input terminal below 3 Volts. This drop in voltage will cause the output of comparitor C1 to change from high to low, which will pull current through the red light emitting diode D1 and close relay R1 triggering a local alarm 410. A signal may also be sent to a house alarm system.

The moisture detection circuit 316 also has a test switch SW1. Closure of this switch pulls current through a 82KΩ resistor R4 to test the generation of the alarm condition by comparitor C1. Additionally, the moisture detection circuit 316 sends a disable signal 412 to the continuity detection circuit 320.

The continuity detection circuit 320 has a high line test switch SW2, for testing the series connection of the first electrodes, and a low line test switch SW3, for testing the series connection of the second electrodes.

Closure of either one of these switches tests the continuity of the electrodes between the moisture detection circuit 316 and the continuity detection circuit 320.

In more detail, the circuit through the normally closed high line test switch SW2 provides an approximately 5 Volt signal at the noninverting input terminal of comparitor C2 as long as a continuity exists to the first terminal 310 of the first electrodes, which receives 5 Volts from the power supply via R1. Comparitor C2 receives a 2 Volt reference at its inverting terminal which is produced by a voltage divider of 15K resistor R5 and 10K resistor R6. As a result, comparitor C2 will produce a high output if continuity exists in the series connected first electrodes or a low output if continuity does not exist.

In a similar vein, when low line test switch SW3 is in its normally closed, current should flow through a 2MΩ resistor R8, through the second electrodes to the grounded first terminal 312. Comparitor C3 compares the voltage of the series connected second electrodes to the 2 Volt reference voltage received at its noninverting input. If continuity exists in the second electrodes, the inverting input terminal should be approximately at ground causing the comparitor C3 to output a high voltage signal.

The circuit continuity detection circuit 320 includes a series of logic gates that light diodes D2 and D3 based upon the output of comparitors C2 and C3 when not disabled by the moisture detection circuit 316. Specifically, when both of comparitors C2 and C3 produce a high signal, indicating continuity, NAND gate G1 produces a low output. This low output in combination with a high signal on line 412 from the moisture detection circuit 316 causes each of NAND gates G2 and G3 to produce a high signal which causes only the green diode D2 to be driven through inverter G4. In contrast, if either one of the outputs of comparitors C2 or C3 is low, indicating a continuity problem, the output of gate G1 will be high causing a low output at gate G3 which drives the yellow lights. Finally, if the moisture detection circuit 316 detects moisture, a low signal is received on line 412 which disables the lighting of diodes D2 and D3.

Figure 5:
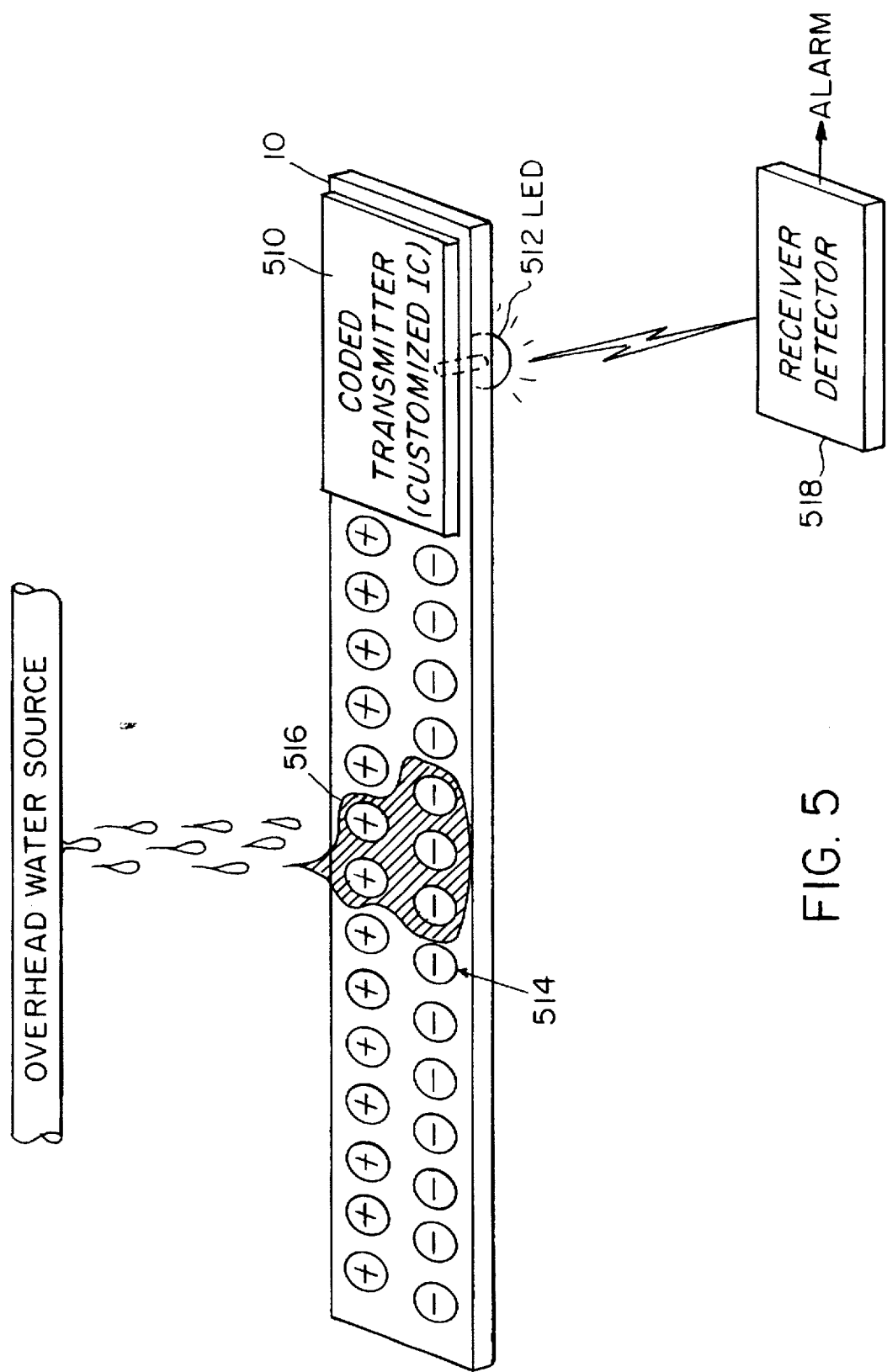
FIG. 5 is a schematic diagram showing a second embodiment of the present invention.

FIG. 5 illustrates a second embodiment of the invention. This embodiment avoids the necessity of wiring the tiles together by placing a coded transmitter 510 on each tile 10. A LED signal light 512 may also, or alternatively, be added on the bottom of the tile 10 for visual identification. The top of the ceiling tile is coated with an electrode grid and water activate battery material 514. Such materials will generate a potential in the presence of water 516. The coded transmitter 510 and LED light 512 are connected across this grid 514 to generate coded radio frequency and visible signals respectively when a voltage is received from the grid 514. A remotely located receiver 518 decodes the radio signals from the ceiling tiles. Thus, when one of the ceiling tiles becomes wet, the alarm is generated and the tile 10 located by decoding its transmission.

While this invention has been particularly shown and described with references to preferred embodiments thereof, it will be understood by those skilled in the art that various changes in form and detail may be made therein without departing from the spirit and scope of the invention as defined by the appended claims.

We claim:

1. A ceiling moisture detection system, comprising:

detection electrodes located on ceiling tiles; and a controller which generates an alarm condition signal in response to moisture contacting the electrodes and wherein the controller comprises a continuity verification circuit for determining whether the detection electrodes are properly connected to each other.

2. A system as described in claim 1, wherein the detection electrodes comprise a pair of interleaved electrodes held at different electrical potentials.

3. A system as described in claim 2, wherein the controller generates the alarm condition signal in response to sensing current flow between the pair of electrodes.

4. A system as described in claim 1, further comprising a coded transmitter which transmits a signal to the controller in response to the alarm condition signal.

5. A system as described in claim 1, wherein the electrodes are located on a top surface of the ceiling tiles.

6. A system as described in claim 5, wherein the detection electrodes are painted on a top surface of the ceiling tiles.

7. A ceiling moisture detection system, comprising:

first electrodes located on ceiling tiles;

second electrodes located on the ceiling tiles;

first connectors which electrically connects the first electrodes of different ceiling tiles together and second connectors which electrically connects the second electrodes of different ceiling tiles together; and a controller which generates a signal in response to electrical current flow between the first and second electrodes and wherein the controller comprises a verification detector which detects breaks in the first or second electrodes or connectors between electrodes of different ceiling tiles.

8. A system as described in claim 7, wherein the verification detector establishes electrical current flow through the first and second electrodes to confirm continuity.

9. A system as described in claim 7, wherein the first electrodes of different ceiling tiles are connected in series with each other.

10. A system as described in claim 7, wherein the first and second electrodes of a ceiling tile form an interleaved comb pattern.

11. A method for detecting moisture intrusion in a building, comprising:

detecting electrical current flow between electrodes located on ceiling tiles;

generating an alarm when the current flow is indicative of moisture on the ceiling tiles; and detecting current flow through the electrodes to determine whether the electrodes are properly connected to each other.

12. A method as described in claim 11, further comprising transmitting a signal from the ceiling tiles to a controller in response to the electrodes contacting moisture.

* * * * *